(12) United States Patent
Ding et al.

(10) Patent No.: US 11,397,494 B2
(45) Date of Patent: Jul. 26, 2022

(54) PIXEL DETECTING CIRCUIT, METHOD FOR DRIVING THE SAME, AND TOUCH DISPLAY PANEL

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Lei Wang, Beijing (CN); Yangbing Li, Beijing (CN); Jiabin Wang, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 366 days.

(21) Appl. No.: 16/496,915

(22) PCT Filed: Apr. 30, 2019

(86) PCT No.: PCT/CN2019/085252
§ 371 (c)(1),
(2) Date: Sep. 23, 2019

(87) PCT Pub. No.: WO2019/228129
PCT Pub. Date: Dec. 5, 2019

(65) Prior Publication Data
US 2021/0365144 A1 Nov. 25, 2021

(30) Foreign Application Priority Data

May 28, 2018 (CN) .................. 201810523303.X

(51) Int. Cl.
*G06F 3/041* (2006.01)
*G06F 3/042* (2006.01)

(52) U.S. Cl.
CPC ........ *G06F 3/0421* (2013.01); *G06F 3/04164* (2019.05); *G06F 3/04166* (2019.05)

(58) Field of Classification Search
CPC . G06F 3/0421; G06F 3/04164; G06F 3/04166
See application file for complete search history.

(56) References Cited

U.S. PATENT DOCUMENTS 7,940,252 B2  5/2011 Chuang et al.
8,451,251 B2  5/2013 Choi et al.
(Continued)

FOREIGN PATENT DOCUMENTS

CN  101943974 A  1/2011
CN  103592791 A  2/2014
(Continued)

OTHER PUBLICATIONS

First Chinese Office Action dated Dec. 17, 2019, received for corresponding Chinese Application No. 201810523303.X, 10 pages.

*Primary Examiner* — Jonathan A Boyd
(74) *Attorney, Agent, or Firm* — Kinney & Lange, P.A.

(57) ABSTRACT

The present disclosure discloses a pixel detecting circuit, a method for driving the same, and a touch display panel. The pixel detecting circuit includes: a plurality of pixel detecting modules arranged in an array; and at least one reading line, wherein each of the reading line is connected to a group of pixel detecting modules, and each group of pixel detecting modules comprises at least two columns of pixel detecting modules; wherein a number of pixel detecting modules included in each group of pixel detecting modules are respectively connected to different control signal terminals, and configured to transmit, under driving of control signals outputted from the different control signal terminals, electrical signals to the connected reading line in any one of a time dividing manner and a frequency dividing manner.

15 Claims, 5 Drawing Sheets

(56) References Cited

U.S. PATENT DOCUMENTS

| | | |
|---|---|---|
| 9,547,398 B2 | 1/2017 | Pan et al. |
| 2009/0101900 A1 | 4/2009 | Chuang et al. |
| 2011/0001711 A1 | 1/2011 | Choi et al. |
| 2011/0310036 A1* | 12/2011 | Juan ............... G06F 3/0412 345/173 |
| 2014/0009406 A1 | 1/2014 | Guard et al. |
| 2015/0062076 A1 | 3/2015 | Pan et al. |
| 2016/0133193 A1* | 5/2016 | Lee ............... G09G 3/3275 345/694 |
| 2018/0151122 A1 | 5/2018 | Ding et al. |
| 2019/0250031 A1 | 8/2019 | Ding et al. |

FOREIGN PATENT DOCUMENTS

| | | |
|---|---|---|
| CN | 105718118 A | 6/2016 |
| CN | 106598327 A | 4/2017 |
| CN | 107314813 A | 11/2017 |
| CN | 107958193 A | 4/2018 |
| CN | 108446055 A | 8/2018 |
| JP | 2017068584 A | 4/2017 |

* cited by examiner

Outputting control signals to respective control signal terminals, so that the at least two columns of pixel detection modules in each group of pixel detection modules transmit, under driving of the received control signals, electrical signals to the connected reading line in any one of a time dividing manner and a frequency dividing manner

601

PIXEL DETECTING CIRCUIT, METHOD FOR DRIVING THE SAME, AND TOUCH DISPLAY PANEL

CROSS-REFERENCE TO RELATED APPLICATION(S)

This application is the national phase of PCT Application No. PCT/CN2019/085252 filed on Apr. 30, 2019, which in turn claims priority to Chinese Application No. 201810523303.X, filed on May 28, 2018, entitled "PIXEL DETECTING CIRCUIT, METHOD FOR DRIVING THE SAME, AND TOUCH DISPLAY PANEL," which is incorporated herein by reference in its entirety.

TECHNICAL FIELD

The present disclosure relates to the field of display technologies, and in particular, to a pixel detecting circuit, a method for driving the same, and a touch display panel.

BACKGROUND

The touch display panel includes a plurality of pixel units arranged in an array, and each of the pixel units is provided with a pixel detecting module, wherein the pixel detecting module is configured to convert the intensity of the detected optical signal into an electrical signal, and output the electrical signal to a processing module through a reading line, so that the processing module determines whether the corresponding pixel area has a touch operation operated thereon according to the output electrical signal.

SUMMARY

The technical solution provided by the present disclosure is as follows.

The first aspect provides a pixel detecting circuit comprising: at least one reading line, and a plurality of pixel detecting modules arranged in an array, each pixel detecting module being configured to detect an optical signal on a pixel area of the pixel detecting module and convert an intensity of the detected optical signal into an electrical signal, wherein each of the reading line is connected to a group of pixel detecting modules, and each group of pixel detecting modules comprises at least two columns of pixel detecting modules;

wherein a number of pixel detecting modules included in each group of pixel detecting modules are respectively connected to different control signal terminals, and configured to transmit, under driving of control signals outputted from the different control signal terminals, the electrical signals to the connected reading line in any one of a time dividing manner and a frequency dividing manner.

Optionally, a total number of the different control signal terminals connected to the pixel detecting modules of a same row in each group of pixel detecting modules is equal to a number of columns of the pixel detecting modules included in each group of pixel detecting modules.

Optionally, each pixel detecting module comprises: an input module, a photosensitive module, a following module, and a first switch module, and the control signal terminals comprise: a first control signal terminal;

the input module is connected to an input signal terminal, a first control node and a first power terminal, respectively, and is configured to input a first power signal from the first power terminal to the first control node under driving of an input signal from the input signal terminal;

the photosensitive module is connected to the first control node and a second power terminal, respectively, and is configured to control a potential of the first control node according to the detected optical signal and a second power signal from the second power terminal;

the following module is connected to the first control node, the first power terminal and a second control node, respectively, and is configured to control, under driving of the first control node, a current input from the first power terminal to the second control node;

the first switch module is connected to the first control signal terminal, the second control node and the reading line, respectively, and is configured to input the current from the second control node to the reading line under driving of the first control signal from the first control signal terminal.

Optionally, the input module comprises: a first transistor having a gate connected to the input signal terminal, a first electrode connected to the first power terminal, and a second electrode connected to the first control node;

the photosensitive module comprises: a photosensitive element having one terminal connected to the first control node and another terminal connected to the second power terminal;

the following module comprises: a second transistor having a gate connected to the first control node, a first electrode connected to the first power terminal and a second electrode connected to the second control node;

the first switch module comprises: a third transistor having a gate connected to the first control signal terminal, a first electrode connected to the second control node and a second electrode connected to the reading line.

Optionally, each pixel detecting module further comprises: a second switch module, and the control signal terminals further comprises: a second control signal terminal;

the second switch module is connected to the second control signal terminal, the second power terminal and the reading line, respectively, and is configured to input the second power signal to the reading line under driving of a second control signal from the second control signal terminal, and a potential of the second power signal is different from a potential of the first power signal.

Optionally, the second switch module comprises: a fourth transistor having a gate connected to the second control signal terminal, a first electrode connected to the second power terminal, and a second electrode connected to the reading line.

Optionally, each group of pixel detecting modules comprises at least two rows of pixel detecting modules.

Optionally, an intensity of the optical signal detected by each of the pixel detecting modules is related to a presence or absence of a touch operation in the pixel area of the pixel detecting module.

The second aspect provides a driving method for driving the pixel detecting circuit of any one of the first aspect, the driving method comprising:

outputting control signals at respective control signal terminals, so that the number of pixel detecting modules included in each group of pixel detecting modules transmit, under driving of the received control signals, the electrical signals to the connected reading line in any one of a time dividing manner and a frequency dividing manner.

Optionally, the control signal terminals comprise: first control signal terminals respectively connected to corresponding pixel detecting modules of the number of pixel detecting modules included in each group of pixel detecting modules, wherein, periods during which first control signals outputted by the first control signal terminals connected to the number of pixel detecting modules included in each group of pixel detecting modules are respectively at a valid potential do not overlap each other, so that the number of pixels detecting modules included in each group of pixel detecting modules transmit, under driving of the received control signals, the electrical signals to the connected reading line in a time dividing manner.

Optionally, the control signal terminals comprise: first control signal terminals and second control signal terminals respectively connected to corresponding pixel detecting modules of the number of pixel detecting modules included in each group of the pixel detecting modules, wherein, sums of lengths of periods during which first control signals outputted by the first control signal terminals connected to the number of pixel detecting modules included in each group of the pixel detecting modules are at a valid potential and lengths of periods during which second control signals outputted by the connected second control signal terminals are at a valid potential are different for each pixel detecting module included in each group of pixel detecting modules, and a period during which the first control signal outputted by the first control signal terminal connected to each pixel detecting module included in each group of the pixel detecting modules is at a valid potential and a period during which the second control signal outputted by the connected second control signal terminal is at a valid potential do not overlap each other; so that the number of pixels detecting modules included in each group of pixel detecting modules transmit, under driving of the received control signals, the electrical signals to the connected reading line in a frequency dividing manner.

The third aspect provides a touch display panel, wherein the touch display panel comprises: at least one pixel unit and at least one pixel detecting circuit of any one of the first aspect.

The fourth aspect provides a storage medium having a computer program stored thereon, and the computer program, when executed by a processor, implements the driving method of the pixel detecting circuit described in the second aspect.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. For those of ordinary skill in the art, other drawings may also be obtained without creative effort.

DETAILED DESCRIPTION

Figure 1:
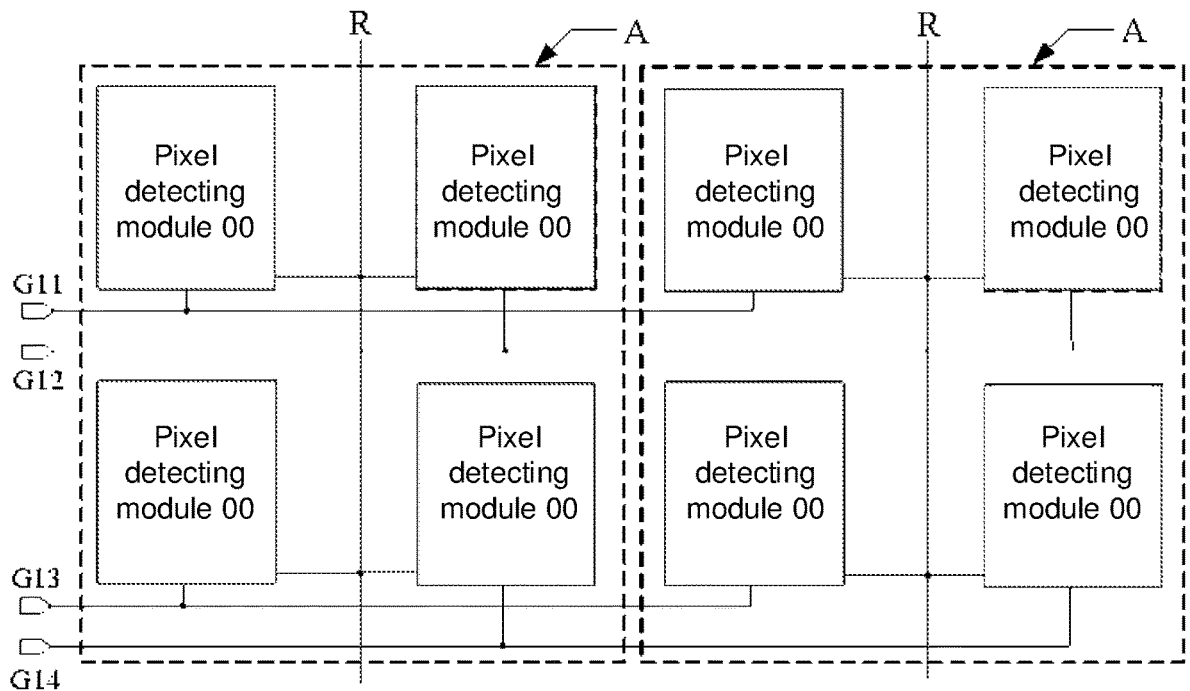
FIG. 1 is a schematic structural diagram of a pixel detecting circuit according to an embodiment of the present disclosure.

In order to make the objects, technical solutions and advantages of the present disclosure more clear, the embodiments of the present disclosure will be further described in detail below with reference to the accompanying drawings.

The transistors employed in all embodiments of the present disclosure may each be a thin film transistor or a field effect transistor or other device having the same characteristics, and the transistors employed in the embodiments of the present disclosure are mainly switching transistors according to the functions in the circuit. Since the source and drain of the switching transistor used here are symmetrical, the source and the drain are interchangeable. In the embodiments of the present disclosure, the source is referred to as a first electrode and the drain is referred to as a second electrode. According to the form in the drawing, the middle end of the transistor is defined as the gate, the signal input end is defined as the source, and the signal output end is defined as the drain. In addition, the switching transistor employed in the embodiments of the present disclosure may be a P-type switching transistor or an N-type switching transistor, wherein the P-type switching transistor is turned on when the gate is at a low level, and is turned off when the gate is at a high level, while the N-type switching transistor is turned on when the gate is at a high level, and is turned off when the gate is at a low level. Furthermore, each of the plurality of signals in various embodiments of the present disclosure has a valid potential and an invalid potential, the valid potential and the invalid potential representing only two states of the potential of the signal.

In the related art, a plurality of pixel detecting modules in each column of pixel units are connected to one reading line, and each of the plurality of pixel detecting modules in each column of pixel units outputs an electrical signal through the reading line connected thereto.

However, since the entire display area on the touch display panel is the effective area of the touch operation, the number of reading lines is large, which is disadvantageous for the implementation of the narrow frame of the touch display panel.

The embodiment of the present disclosure provides a pixel detecting circuit that may be applied to a touch display panel. Referring to FIG. 1, the pixel detecting circuit may include: at least one reading line R and a plurality of pixel detecting modules 00 arranged in an array.

Each pixel detecting module is configured to detect an optical signal on a pixel area thereof and convert the intensity of the detected optical signal into an electrical signal. Each of the reading line R is connected to a group of pixel detecting modules (a number of pixel detecting modules in each of the dashed boxes A in FIG. 1 form a group of pixel detecting modules), and each group of pixel detecting modules includes at least two columns of pixel detecting modules. The number of pixel detecting modules 00 included in each group of pixel detecting modules are respectively connected to different control signal terminals, and different control signal terminals output different control signals. The number of pixel detecting modules included in each group of pixel detecting modules are configured to transmit the electrical signals to the connected reading line R in any one of a time dividing manner and a frequency dividing manner under the driving of the control signals outputted from the different control signal terminals.

For example, referring to FIG. 1, each reading line R is connected to two columns of pixel detecting modules. The four pixel detecting modules 00 included in a group of pixel detecting modules on the left side of FIG. 1 are respectively connected to the control signal terminal G11, the control signal terminal G12, the control signal terminal G13, and the control signal terminal G14. The control signal terminal G11, the control signal terminal G12, the control signal terminal G13, and the control signal terminal G14 output different control signals. The four pixel detecting modules 00 may transmit electrical signals representing touch signals to the connected reading line R in any one of a time dividing manner and a frequency dividing manner under the driving of the control signals outputted from respective connected control signal terminals. It should be noted that FIG. 1 only shows a schematic diagram in which each reading line R is connected to two columns of pixel detecting modules. For schematic diagrams in which each reading line R is connected to more columns of pixel detecting modules, refer to FIG. 1 accordingly.

When the number of pixel detecting modules 00 included in each group of pixel detecting modules transmit touch signals to the connected reading line R in a time dividing manner, since the period during which each pixel detecting module 00 transmits the touch signal is different, the processing module may determine, according to the period during which the signal is received, which pixel area the received signal corresponds to, thereby identifying whether there is a touch operation in the corresponding pixel area. When the number of pixel detecting modules included in each group of pixel detecting modules transmit the touch signals to the connected reading line R in a frequency dividing manner, since the frequency of the touch signal transmitted by each pixel detecting module 00 is different, the processing module may determine, according to the frequency of the received signal, which pixel area the received signal corresponds to, thereby identifying whether there is a touch operation in the corresponding pixel area. Therefore, through the pixel detecting circuit, the number of pixel detecting modules included in each group of pixel detecting modules are able of efficiently transmitting electric signals representing the touch signals to the reading line R, and it is possible to reduce the number of reading lines R provided in the pixel detecting circuit.

In summary, according to the pixel detecting circuit provided by the embodiment of the present disclosure, each reading line in the pixel detecting circuit is connected to a group of pixel detecting modules, and each group of pixel detecting modules includes at least two columns of pixel detecting modules. By controlling the control signals provided to the number of pixel detecting modules included in each group of pixel detecting modules, the number of pixel detecting modules included in each group of pixel detecting modules are capable of efficiently transmitting the touch signals to the reading line, and it is possible to reduce the number of reading lines provided in the pixel detecting circuit, which is advantageous for the implementation of the narrow frame of the touch display panel.

Optionally, among the plurality of pixel detecting modules 00 arranged in the array, the total number of control signal terminals connected to the plurality of pixel detecting modules 00 in the same row may be greater than or equal to the number of columns of the pixel detecting modules 00 included in each group of pixel detecting modules. When, among the plurality of pixel detecting modules 00 arranged in the array, the total number of control signal terminals connected to the plurality of pixel detecting modules 00 in the same row is equal to the number of columns of the pixel detecting modules 00 included in each group of the pixel detecting modules, the total number of control signal terminals connected to the pixel detecting circuit can be reduced, and the total number of connecting lines connected to the control signal terminals in the pixel detecting circuit can be reduced, which is advantageous for the implementation of the narrow frame of the touch display panel. For example, referring again to FIG. 1, the number of columns of the pixel detecting modules 00 included in each group of pixel detecting modules is 2, and the total number of control signal terminals connected to the plurality of pixel detecting modules 00 in the same row is 2, and the two numbers are equal. Furthermore, for the pixel detecting modules 00 located in the same row in the number of pixel detecting modules 00 included in each group of pixel detecting modules, one pixel detecting module 00 is connected to one control signal terminal, and another pixel detecting module 00 is connected to another control signal terminal.

In an implementable manner, each group of pixel detecting modules may include: multiple adjacent columns of pixel detecting modules. For example, referring again to FIG. 1, each group of pixel detecting modules may include: two adjacent columns of pixel detecting modules.

In an implementable manner, each group of pixel detecting modules may include: multiple adjacent rows of pixel detecting modules. For example, referring again to FIG. 1, each group of pixel detecting modules may include: two adjacent rows of pixel detecting modules.

Figure 2:
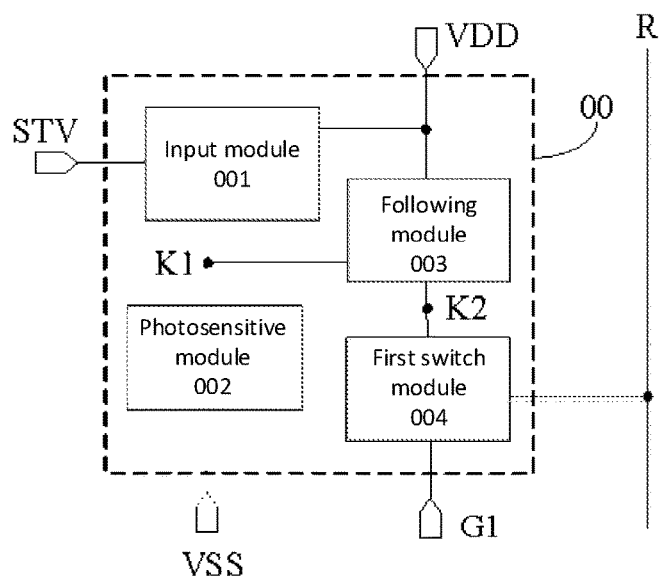
FIG. 2 is a schematic structural diagram of a pixel detecting module according to an embodiment of the present disclosure.

Referring to FIG. 2, each pixel detecting module 00 may include: an input module 001, a photosensitive module 002, a following module 003, and a first switch module 004. The control signal terminals may include: a first control signal terminal G1.

The input module 001 is connected to an input signal terminal STV, a first control node K1 and a first power terminal VDD, respectively, and the input module 001 is configured to input a first power signal from the first power terminal VDD to the first control node K1 when the potential of the input signal from the input signal terminal STV is at a valid potential. The potential of the first power signal is at a valid potential.

The photosensitive module 002 is connected to the first control node K1 and a second power terminal VSS, respectively, and the photosensitive module 002 is configured to control the potential of the first control node K1 according to the detected optical signal and a second power signal from the second power terminal VSS. The control effect of the photosensitive module 002 on the potential of the first control node K1 is as follows: when the intensity of the optical signal detected by the photosensitive module 002 is stronger, the potential of the first control node K1 decreases at a higher speed. For example, when there is a touch operation in the pixel area, the intensity of the optical signal detected by the photosensitive module 002 is strong, and the potential of the first control node K1 decreases at a high speed. When there is no touch operation in the pixel area, the intensity of the optical signal detected by the photosensitive module 002 is weak, and the potential of the first control node K1 decreases at a low speed.

The following module 003 is connected to the first control node K1, the first power terminal VDD and a second control node K2, respectively, and the following module 003 is configured to control, under the driving of the first control node K1, the current input from the first power terminal VDD to the second control node K2. The control effect of the following module 003 on the current input from the first power terminal VDD to the second control node K2 is as follows: when the potential of the first control node K1 is higher, the current input from the first power terminal VDD to the second control node K2 is controlled to be larger.

The first switch module 004 is connected to the first control signal terminal G1, the second control node K2 and the reading line R, respectively, and the first switch module 004 is configured to input the current from the second control node K2 to the reading line R when the potential of the first control signal from the first control signal terminal G1 is at the valid potential, in order to implement the transmission of the touch signal to be detected.

Figure 3:
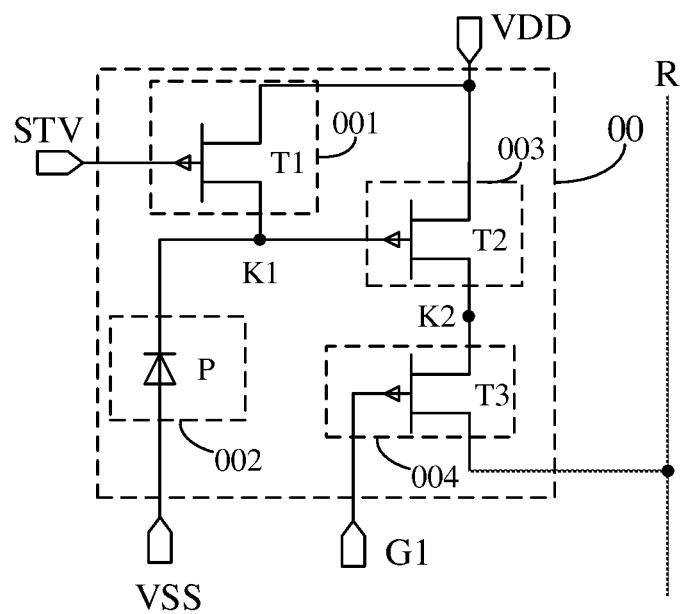
FIG. 3 is a schematic structural diagram of another pixel detecting module according to an embodiment of the present disclosure.

Optionally, referring to FIG. 3, the input module 001 may include: a first transistor T1 having a gate connected to the input signal terminal STV, a first electrode connected to the first power terminal VDD, and a second electrode connected to the first control node K1.

Referring again to FIG. 3, the photosensitive module 002 may include: a photosensitive element P having one terminal connected to the first control node K1 and another terminal connected to the second power terminal VSS. The photosensitive element P may be a photodiode that can detect an optical signal and convert the optical signal into a current or voltage of a corresponding magnitude based on the intensity of the detected optical signal.

Referring again to FIG. 3, the following module 003 may include: a second transistor T2 having a gate connected to the first control node K1, a first electrode connected to the first power terminal VDD and a second electrode connected to the second control node K2.

Referring again to FIG. 3, the first switch module 004 may include: a third transistor T3 having a gate connected to the first control signal terminal G1, a first electrode connected to the second control node K2 and a second electrode connected to the reading line R.

Figure 4:
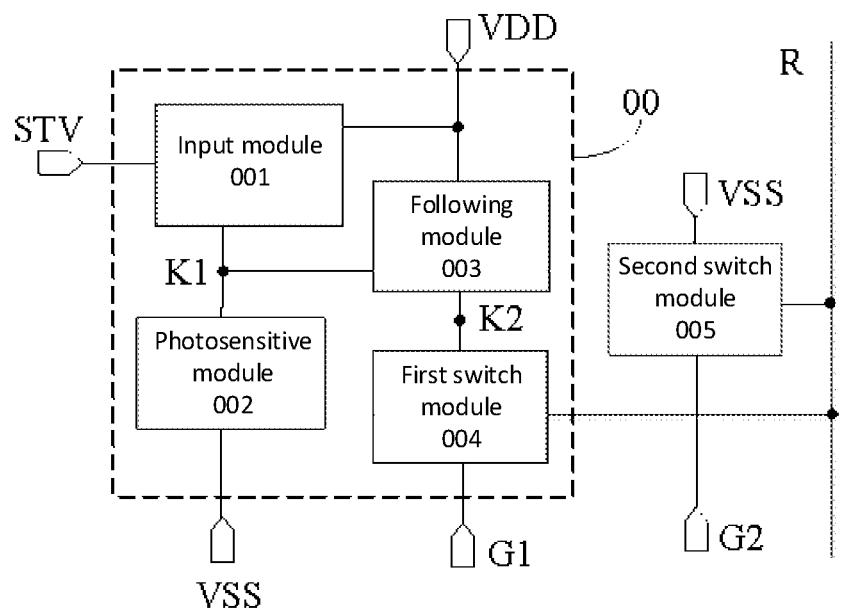
FIG. 4 is a schematic structural diagram of still another pixel detecting module according to an embodiment of the present disclosure.

Further, referring to FIG. 4, each pixel detecting module 00 may further include a second switch module 005, and the control signal terminals may further include a second control signal terminal G2. The second switch module 005 is connected to a second control signal terminal G2, a second power terminal VSS and the reading line R, respectively, and the second switch module 005 is configured to input a second power signal to the reading line R under the driving of a second control signal from the second control signal terminal G2. The period during which the second switch module 005 is turned on may be different from the period during which the first switch module 004 is turned on, to modulate the touch signal input to the reading line through the first switch module 004, such that the signal input to the reading line R is at the preset frequency.

Figures 5, 6:
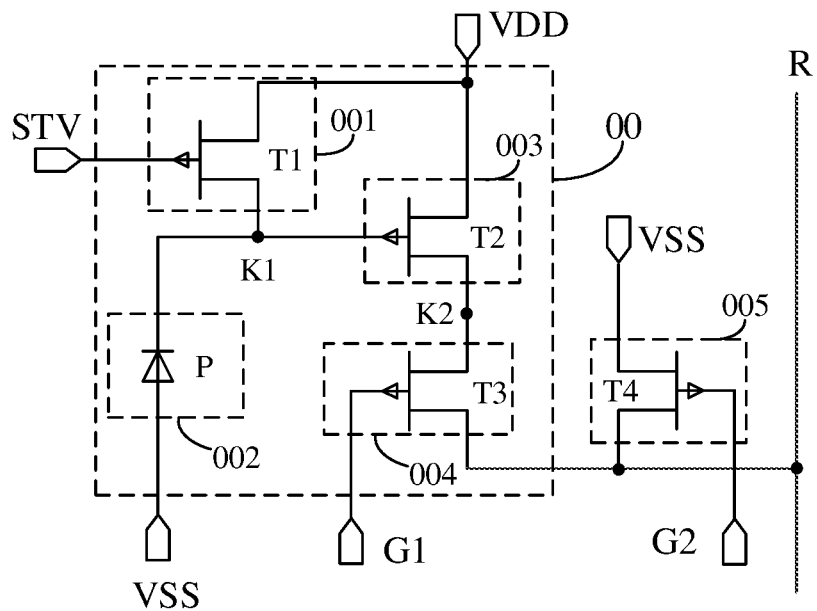
FIG. 5 is a schematic structural diagram of yet another pixel detecting module according to an embodiment of the present disclosure.
FIG. 6 is a flowchart of a driving method of a pixel detecting circuit according to an embodiment of the present disclosure.

Optionally, referring to FIG. 5, the second switch module 005 may include: a fourth transistor T4 having a gate connected to the second control signal terminal G2, a first electrode connected to the second power terminal VSS, and a second electrode connected to the reading line R. The potential of the second power signal provided by the second power terminal VSS is different from the potential of the first power signal provided by the first power terminal VDD. For example, the potential of the second power signal is an invalid potential while the potential of the first power signal is a valid potential.

In summary, according to the pixel detecting circuit provided by the embodiment of the present disclosure, each reading line in the pixel detecting circuit is connected to a group of pixel detecting modules, and each group of pixel detecting modules includes at least two columns of pixel detecting modules. By controlling the control signals provided to the number of pixel detecting modules included in each group of pixel detecting modules, the number of pixel detecting modules included in each group of pixel detecting modules are capable of efficiently transmitting the touch signals to the reading line, and it is possible to reduce the number of reading lines provided in the pixel detecting circuit, which is advantageous for the implementation of the narrow frame of the touch display panel.

The embodiment of the present disclosure provides a method for driving a pixel detecting circuit. The method can be used to control the pixel detecting circuit as shown in any one of FIG. 1 to FIG. 5. As shown in FIG. 6, the method may include:

Step 601: outputting control signals at respective control signal terminals, so that the number of pixel detecting modules included in each group of pixel detecting modules transmit, under driving of the received control signals, the electrical signals to the connected reading line in any one of a time dividing manner and a frequency dividing manner.

In summary, according to the method for driving a pixel detecting circuit provided by the embodiment of the present disclosure, each reading line in the pixel detecting circuit is connected to a group of pixel detecting modules, and each group of pixel detecting modules includes at least two columns of pixel detecting modules. By controlling the control signals provided to the number of pixel detecting modules included in each group of pixel detecting modules, the number of pixel detecting modules included in each group of pixel detecting modules are capable of efficiently transmitting the touch signals to the reading line, and it is possible to reduce the number of reading lines provided in the pixel detecting circuit, which is advantageous for the implementation of the narrow frame of the touch display panel.

The implementation of the step 601 may include at least the following two manners.

In a first implementation, the control signal terminals may include: first control signal terminals respectively connected to the number of pixel detecting modules included in each group of pixel detecting modules. In this case, the periods during which first control signals outputted by the first control signal terminals connected to the number of pixel detecting modules included in each group of pixel detecting modules are respectively at the valid potential may be controlled not to overlap each other with respect to the respective pixel detecting modules, so that the number of pixels detecting modules included in each group of pixel detecting modules transmit, under driving of the first control signals from the first control signal terminals, the electrical signals to the connected reading line in a time dividing manner.

For example, as shown in FIG. 3, when each of the first switch modules 004 of the number of pixel detecting modules included in each group of pixel detecting modules includes the third transistor T3, if the periods during which first control signals outputted by the first control signal terminals G1 connected to the number of pixel detecting modules included in each group of pixel detecting modules are respectively at the valid potential do not overlap each other with respect to the respective pixel detecting modules, under driving of the respective first control signals, periods during which the third transistors T3 of the number of pixel detecting modules included in each group of pixel detecting modules are respectively in an on state are different, so that the periods during which the touch signals are transmitted to the reading line R through the corresponding third transistors T3 are different, so that the electric signals representing the touch signals are transmitted to the connected reading line R in a time dividing manner.

In a second implementation, the control signal terminals may include: first control signal terminals and second control signal terminals respectively connected to the number of pixel detecting modules included in each group of the pixel detecting modules. In this case, the sums of the lengths of periods during which first control signals outputted by the first control signal terminals are at a valid potential and the lengths of periods during which second control signals outputted by the connected second control signal terminals are at a valid potential may be controlled to be different for each pixel detecting module included in each group of pixel detecting modules, and the period during which the first control signal outputted by the first control signal terminal connected to each pixel detecting module included in each group of the pixel detecting modules is at a valid potential and the period during which the second control signal outputted by the connected second control signal terminal is at a valid potential do not overlap each other, so that the number of pixels detecting modules included in each group of pixel detecting modules transmit, under driving of the received control signals, the electrical signals to the connected reading line in a frequency dividing manner.

For example, as shown in FIG. 5, when each of the first switch modules 004 of the number of pixel detecting modules included in each group of pixel detecting modules includes the third transistor T3, and each of the second switch modules 005 includes the fourth transistor T4, if the period during which the first control signal outputted by the first control signal terminal G1 connected to each pixel detecting module 00 is at the valid potential is complementary to the period during which the second control signal outputted by the connected second control signal terminal G2 is at the valid potential, then, under the driving of the first control signal and the second control signal, the period during which the third transistor T3 is in an on state and the period during which the fourth transistor T4 is in an on state in each pixel detecting module 00 are complementary, so that the signal input to the reading line R through the corresponding pixel detecting module 00 is at a preset frequency. Furthermore, when the sums of the lengths of periods during which first control signals outputted by the first control signal terminals G1 connected to the number of pixel detecting modules included in each group of the pixel detecting modules are at the valid potential and the lengths of periods during which second control signals outputted by the connected second control signal terminals G2 are at the valid potential are different, the number of pixel detecting modules included in each group of pixel detecting modules input signals of different frequencies to the reading line R via the third transistor T3 and the fourth transistor T4 included therein, so as to transmit electrical signals representing touch signals to the connected reading line R in a frequency dividing manner.

Figure 7:
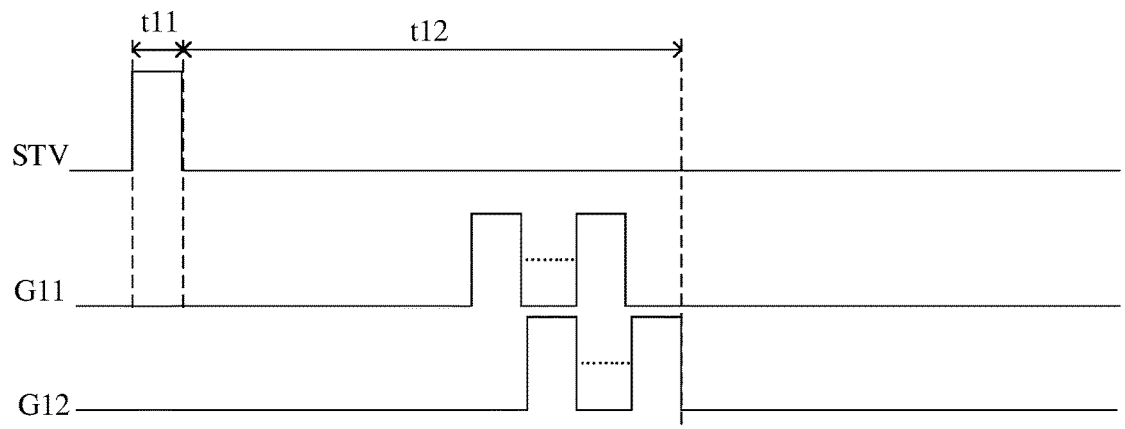
FIG. 7 is a timing sequence of a driving process of a pixel detecting circuit according to an embodiment of the present disclosure.

The pixel detecting circuit shown in FIG. 3 and the timing sequence shown in FIG. 7 are taken as an example to describe a driving method of the pixel detecting circuit provided by the embodiment of the present disclosure. The operating process of each pixel detecting module in the pixel detecting circuit is as following.

Referring to FIG. 7, in the charging phase t11, the input signal from the input signal terminal STV is at a valid potential, and the first power signal outputted by the first power terminal VDD is at a valid potential. At this time, the first transistor T1 is turned on under the driving of the input signal, and the first power terminal VDD inputs the first power signal at a valid potential to the first control node K1 via the first transistor T1 to charge the first control node K1.

In the detecting phase t12, the input signal from the input signal terminal STV is at an invalid potential, and the first transistor T1 is turned off under the control of the input signal to stop charging the first control node K1. The photosensitive element P detects the optical signal, and converts the optical signal into a current of a corresponding magnitude according to the intensity of the detected optical signal. The potential of the first control node K1 gradually decreases under the action of the photosensitive element P, and when the intensity of the optical signal is stronger, the potential of the first control node K1 decreases at a higher speed. Since the first control node K1 is charged to the valid potential after the charging phase t11, the second transistor T2 is turned on under the driving of the first control node K1, and the first power terminal VDD inputs the first power signal to the second control node K2 via the second transistor T2. In the process of inputting the first power signal to the second control node K2, the current inputted by the first power terminal VDD to the second control node K2 follows the potential of the first control node K1, and the current is positively correlated with the potential.

Furthermore, the first control signal outputted by the first control signal terminal G1 in the detecting phase t12 is a square wave signal. When the first control signal is at a valid potential, the third transistor T3 is turned on under the driving of the first control signal which is at a valid potential, and the second control node K2 inputs a signal to the reading line R via the third transistor T3. The signal input to the reading line R is converted from the optical signal detected by the photosensitive element P, and the intensity of the optical signal is related to the presence or absence of a touch operation in the pixel area. Specifically, the intensity of the optical signal changes depending on whether there is a touch operation in the pixel area. Therefore, the signal input to the reading line R is a touch signal for characterizing whether there is a touch operation in the pixel area. After the touch signal is transmitted to the processing module via the reading line R, the processing module may determine whether there is a touch operation in the corresponding pixel area according to the amplitude of the touch signal.

In an implementation, among the plurality of pixel detecting modules connected to the same reading line R, the plurality of pixel detecting modules in the same column operate in a progressive scan mode. For example, two pixel detecting modules 00 in each column of FIG. 1 operate in a progressive scan mode. For the plurality of pixel detecting modules in the same row, the periods during which the first control signals outputted by the first control signal terminals connected to the plurality of pixel detecting modules are respectively at a valid potential do not overlap each other, and the plurality of pixel detecting modules input touch signals to the reading line R in a time dividing manner. For example, the two pixel detecting modules in the upper row of the group of pixel detecting modules on the left side of FIG. 1 are respectively connected to the control signal terminal G11 and the control signal terminal G12. As shown in FIG. 7, the period during which the first control signal outputted by the control signal terminal G11 is at the valid potential and the period during which the first control signal outputted by the control signal terminal G12 is at the valid potential do not overlap each other, such that the left pixel detecting module 00 and the right pixel detecting module 00 of the two pixel detecting modules sequentially input touch signals to the reading line R upon receiving the first control signals outputted by the corresponding control signal terminals.

Figure 8:
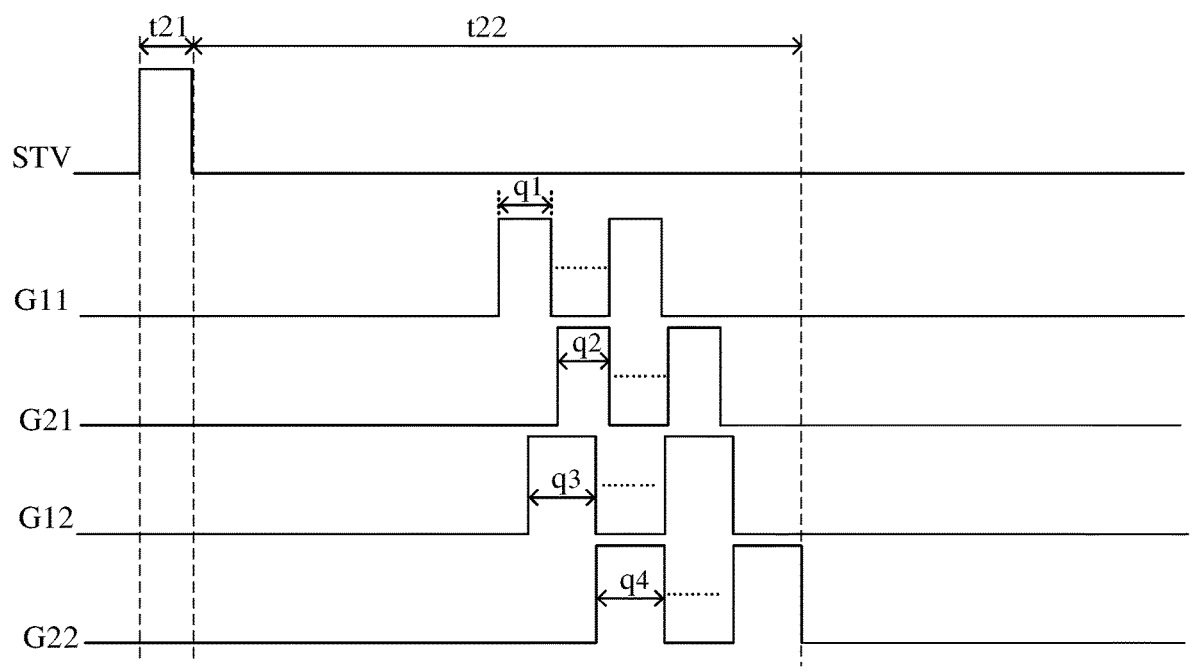
FIG. 8 is a timing sequence of another driving process of a pixel detecting circuit according to an embodiment of the present disclosure.

The pixel detecting circuit shown in FIG. 5 and the timing sequence shown in FIG. 8 are taken as an example to describe a driving method of the pixel detecting circuit provided by the embodiment of the present disclosure. The operating process of each pixel detecting module 00 is as following.

For the operating process of the first transistor T1, the second transistor T2, and the third transistor T3 in the pixel detecting circuit shown in FIG. 5 in the charging phase t21 and the detecting phase t22, refer to the operating process of the first transistor T1, the second transistor T2 and the third transistor T3 in FIG. 3, respectively, and details are not described herein again.

Furthermore, in the pixel detecting circuit shown in FIG. 5, in the detecting phase t22, when the second control signal outputted by the second control signal terminal G2 is at the valid potential, the fourth transistor T4 is turned on under the driving of the second control signal, and the second power terminal VSS inputs a second power signal which is at an invalid potential to the reading line R via the fourth transistor T4.

Among the plurality of pixel detecting modules connected to the same reading line R, the plurality of pixel detecting modules in the same column operate in a progressive scan mode. For example, two pixel detecting modules 00 in each column of FIG. 1 operate in a progressive scan mode.

Figure 9:
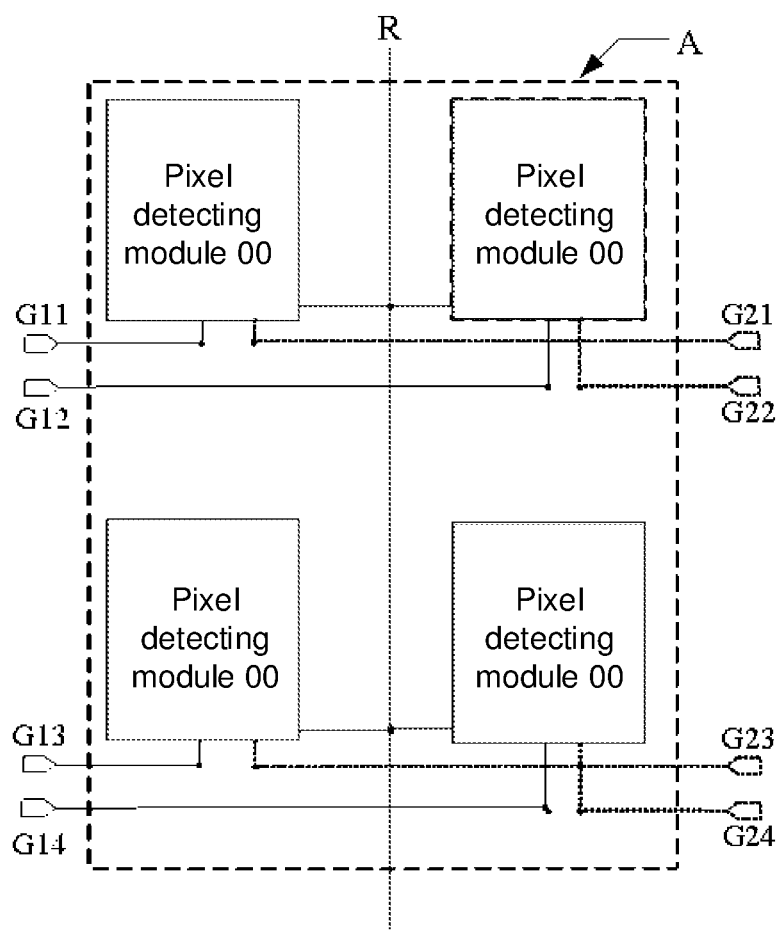
FIG. 9 is a schematic structural diagram of the group of pixel detecting modules on the left side of FIG. 1.

For each pixel detecting module 00 of the plurality of pixel detecting modules in the same row, the period during which the first control signal outputted by the first control signal terminal G1 connected to the pixel detecting module is at a valid potential and the period during which the second control signal outputted by the second control signal terminal G2 connected to the pixel detecting module is at a valid potential do not overlap each other; and the sum of the length of periods during which the first control signal outputted by the first control signal terminal connected to the pixel detecting module is at a valid potential and the length of periods during which the second control signal outputted by the second control signal terminal connected to the pixel detecting module is at a valid potential is different, so that the plurality of pixels detecting modules 00 transmit touch signals to the connected reading line R in a frequency dividing manner. FIG. 9 is a schematic structural diagram of the group of pixel detecting modules on the left side of FIG. 1. For example, in the two pixel detecting modules of the upper row, the left pixel detecting module 00 is respectively connected to the control signal terminal G11 and the control signal terminal G21 (shown by a broken line in FIG. 9), and the right pixel detecting module 00 is respectively connected to the control signal terminal G12 and the control signal terminal G22 (shown by a broken line in FIG. 9). In the two pixel detecting modules of the lower row, the left pixel detecting module 00 is respectively connected to the control signal terminal G13 and the control signal terminal G23 (shown by a broken line in FIG. 9), and the right pixel detecting module 00 is respectively connected to the control signal terminal G14 and the control signal terminal G24 (shown by a broken line in FIG. 9). As shown in FIG. 8, the length of period during which the first control signal outputted by the control signal terminal G11 is at the valid potential is assumed to be q1, the length of period during which the second control signal outputted by the control signal terminal G21 is at the valid potential is assumed to be q2, and the first sum of lengths of periods is (q1+q2); the length of period during which the first control signal outputted by the control signal terminal G12 is at the valid potential is assumed to be q3, the length of period during which the second control signal outputted by the control signal terminal G22 is at the valid potential is assumed to be q4, and the second sum of lengths of periods is (q3+q4); the first sum of lengths of periods (q1+q2) is different from the second sum of lengths of periods (q3+q4). Furthermore, the period during which the first control signal outputted by the control signal terminal G11 is at the valid potential does not overlap the period during which the second control signal outputted by the control signal terminal G21 is at the valid potential, and the period during which the first control signal outputted by the control signal terminal G12 is at the valid potential does not overlap the period during which the second control signal outputted by the control signal terminal G22 is at the valid potential. After receiving the first control signal outputted by the connected control signal terminal G11 and receiving the second control signal outputted by the connected control signal terminal G21, the left pixel detecting module 00 may input a touch signal of the frequency of f1=1/(q1+q2) to the reading line. After receiving the first control signal outputted by the connected control signal terminal G12 and receiving the second control signal outputted by the connected control signal terminal G22, the right pixel detecting module 00 may input a touch signal of the frequency of f2=1/(q3+q4) to the reading line. Thus, the plurality of pixel detecting modules in the same row input the touch signals to the reading line R in different frequencies.

In summary, according to the method for driving a pixel detecting circuit provided by the embodiment of the present disclosure, each reading line in the pixel detecting circuit is connected to a group of pixel detecting modules, and each group of pixel detecting modules includes at least two columns of pixel detecting modules. By controlling the control signals provided to the number of pixel detecting modules included in each group of pixel detecting modules, the number of pixel detecting modules included in each group of pixel detecting modules are capable of efficiently transmitting the touch signals to the reading line, and it is possible to reduce the number of reading lines provided in the pixel detecting circuit, which is advantageous for the implementation of the narrow frame of the touch display panel.

The embodiment of the present disclosure provides a touch display panel, which may include a pixel unit and a pixel detecting circuit provided by an embodiment of the present disclosure. The touch display panel may be any product or part that has display and touch capabilities, such as a liquid crystal panel, an electronic paper, an organic light emitting diode (OLED) panel, a mobile phone, a tablet computer, a television, a display, a notebook computer, a digital photo frame, a navigator, and the like.

The embodiment of the present disclosure further provides a storage medium in which a computer program is stored, and the computer program, when executed by a processor, implements the driving method of the pixel detecting circuit provided by the embodiment of the present disclosure.

The above description is only the preferred embodiment of the present disclosure, and is not intended to limit the present disclosure. Any modifications, equivalents, improvements, and the like, which are made within the spirit and scope of the present disclosure are intended to be included within the scope of the present disclosure.

We claim:

1. A pixel detecting circuit comprising:
at least one reading line, and
a plurality of pixel detecting modules arranged in an array, each pixel detecting module being configured to detect an optical signal on a pixel area of the pixel detecting module and convert an intensity of the detected optical signal into an electrical signal,
wherein each of the at least one reading line is connected to a group of pixel detecting modules, and each group of pixel detecting modules comprises at least two columns of pixel detecting modules;
wherein a plurality of pixel detecting modules included in each group of pixel detecting modules are respectively connected to different control signal terminals, and configured to transmit, under driving of control signals outputted from the different control signal terminals, the electrical signals to the connected reading line in any one of a time dividing manner or a frequency dividing manner;
wherein each pixel detecting module comprises: an input module, a photosensitive module, a following module, and a first switch module, and the control signal terminals comprise a first control signal terminal; and wherein:
the input module is connected to an input signal terminal, a first control node and a first power terminal, respectively, and is configured to input a first power signal from the first power terminal to the first control node under driving of an input signal from the input signal terminal;
the photosensitive module is connected to the first control node and a second power terminal, respectively, and is configured to control a potential of the first control node according to the detected optical signal and a second power signal from the second power terminal;
the following module is connected to the first control node, the first power terminal and a second control node, respectively, and is configured to control, under driving of the first control node, a current input from the first power terminal to the second control node; and
the first switch module is connected to the first control signal terminal, the second control node and the reading line, respectively, and is configured to input the current from the second control node to the reading line under driving of a first control signal from the first control signal terminal.

2. The pixel detecting circuit of claim 1, wherein a total number of the different control signal terminals connected to the pixel detecting modules of a same row in each group of pixel detecting modules is equal to a number of columns of the pixel detecting modules included in each group of pixel detecting modules, and wherein different columns of pixel detecting modules included in each ground of pixel detecting module are connected to different control signal terminals.

3. The pixel detecting circuit of claim 1, wherein:
the input module comprises: a first transistor having a gate connected to the input signal terminal, a first electrode connected to the first power terminal, and a second electrode connected to the first control node;
the photosensitive module comprises: a photosensitive element having one terminal connected to the first control node and another terminal connected to the second power terminal;
the following module comprises: a second transistor having a gate connected to the first control node, a first electrode connected to the first power terminal and a second electrode connected to the second control node; and
the first switch module comprises: a third transistor having a gate connected to the first control signal terminal, a first electrode connected to the second control node and a second electrode connected to the reading line.

4. The pixel detecting circuit of claim 1, wherein each pixel detecting module further comprises a second switch module, and the control signal terminals further comprise a second control signal terminal; and wherein:
the second switch module is connected to the second control signal terminal, the second power terminal and the reading line, respectively, and is configured to input the second power signal to the reading line under driving of a second control signal from the second control signal terminal, and a potential of the second power signal is different from a potential of the first power signal.

5. The pixel detecting circuit of claim 4, wherein the second switch module comprises: a fourth transistor having a gate connected to the second control signal terminal, a first electrode connected to the second power terminal, and a second electrode connected to the reading line.

6. The pixel detecting circuit of claim 1, wherein each group of pixel detecting modules comprises at least two rows of pixel detecting modules.

7. The pixel detecting circuit of claim 1, wherein an intensity of the optical signal detected by each of the pixel detecting modules is related to a presence or absence of a touch operation in the pixel area of the pixel detecting module.

8. A touch display panel, wherein the touch display panel comprises: at least one pixel unit and at least one pixel detecting circuit of claim 1.

9. The pixel detecting circuit of claim 3, wherein each pixel detecting module further comprises a second switch module, and the control signal terminals further comprise a second control signal terminal; and wherein:
the second switch module is connected to the second control signal terminal, the second power terminal and the reading line, respectively, and is configured to input the second power signal to the reading line under driving of a second control signal from the second control signal terminal, and a potential of the second power signal is different from a potential of the first power signal.

10. The pixel detecting circuit of claim 9, wherein the second switch module comprises a fourth transistor having a gate connected to the second control signal terminal, a first electrode connected to the second power terminal, and a second electrode connected to the reading line.

11. The pixel detecting circuit of claim 10, wherein:
the second power signal is at an invalid potential and the first power signal is at a valid potential; or the first power signal is at an invalid potential and the second power signal is at a valid potential.

12. The pixel detecting circuit of claim 3, wherein periods during which first control signals outputted by the first control signal terminals connected to the plurality of pixel detecting modules included in each group of pixel detecting modules are respectively at a valid potential do not overlap each other with respect to the respective pixel detecting modules.

13. The pixel detecting circuit of claim 10, wherein sums of lengths of periods during which first control signals outputted by the first control signal terminals are at a valid potential and lengths of periods during which second control signals outputted by the connected second control signal terminals are at a valid potential are different for each pixel detecting module included in each group of pixel detecting modules, and a period during which the first control signal outputted by the first control signal terminal connected to each pixel detecting module included in each group of the pixel detecting modules is at a valid potential and a period during which the second control signal outputted by the connected second control signal terminal is at a valid potential do not overlap each other.

14. A driving method for driving a pixel detecting circuit, the pixel detecting circuit comprising at least one reading line, and a plurality of pixel detecting modules arranged in an array, each pixel detecting module being configured to detect an optical signal on a pixel area of the pixel detecting module and convert an intensity of the detected optical signal into an electrical signal, wherein each of the at least one reading line is connected to a group of pixel detecting modules, and each group of pixel detecting modules comprises at least two columns of pixel detecting modules, and wherein a plurality of pixel detecting modules included in each group of pixel detecting modules are respectively connected to different control signal terminals, and configured to transmit electrical signals, wherein each pixel detecting module comprises an input module, a photosensitive module, a following module, a first switch module, and a second switch module, and the control signal terminals comprise a first control signal terminal and a second control signal terminal, and wherein:

the input module is connected to an input signal terminal, a first control node and a first power terminal, respectively, and is configured to input a first power signal from the first power terminal to the first control node under driving of an input signal from the input signal terminal;

the photosensitive module is connected to the first control node and a second power terminal, respectively, and is configured to control a potential of the first control node according to the detected optical signal and a second power signal from the second power terminal;

the following module is connected to the first control node, the first power terminal and a second control node, respectively, and is configured to control, under driving of the first control node, a current input from the first power terminal to the second control node;

the first switch module is connected to the first control signal terminal, the second control node and the reading line, respectively, and is configured to input the current from the second control node to the reading line under driving of a first control signal from the first control signal terminal; and the second switch module is connected to the second control signal terminal, the second power terminal and the reading line, respectively, and is configured to input the second power signal to the reading line under driving of a second control signal from the second control signal terminal, and a potential of the second power signal is different from a potential of the first power signal, the driving method comprising:
outputting control signals at respective control signal terminals, so that the plurality of pixel detecting modules included in each group of pixel detecting modules transmit, under driving of the received control signals, the electrical signals to the connected reading line in a frequency dividing manner;

wherein sums of lengths of periods during which first control signals outputted by the first control signal terminals are at a valid potential and lengths of periods during which second control signals outputted by the connected second control signal terminals are at a valid potential are different for each pixel detecting module included in each group of pixel detecting modules, and a period during which the first control signal outputted by the first control signal terminal connected to each pixel detecting module included in each group of the pixel detecting modules is at a valid potential and a period during which the second control signal outputted by the connected second control signal terminal is at a valid potential do not overlap each other, so that the plurality of pixel detecting modules included in each group of pixel detecting modules transmit, under driving of the received control signals, the electrical signals to the connected reading line in a frequency dividing manner.

15. The method of claim 14, wherein a total number of the different control signal terminals connected to the pixel detecting modules of a same row in each group of pixel detecting modules is equal to a number of columns of the pixel detecting modules included in each group of pixel detecting modules, and wherein different columns of pixel detecting modules included in each group of pixel detecting module are connected to different control signal terminals.

* * * * *